UNITED STATES PATENT OFFICE.

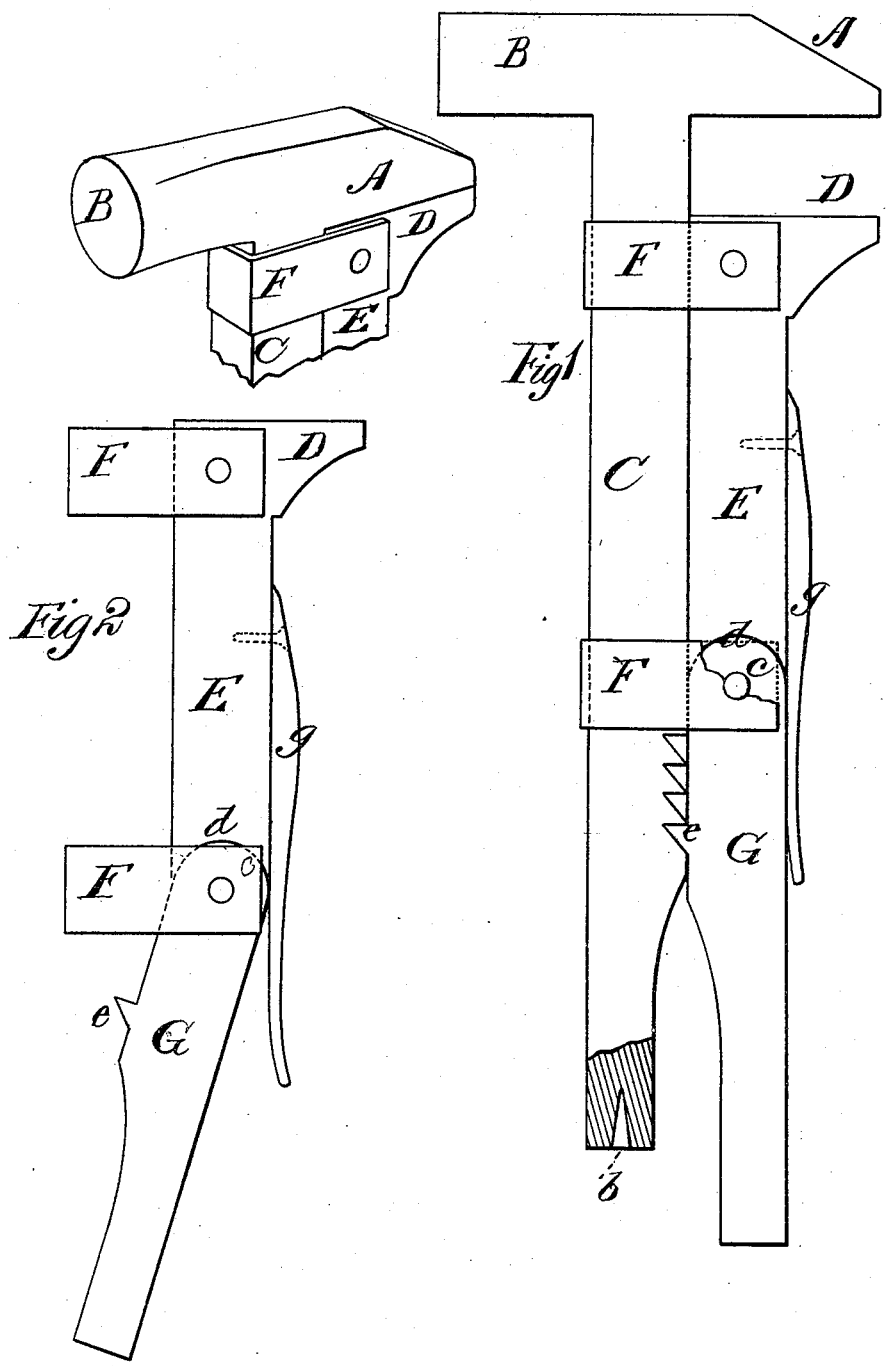

DAVID H. JARRARD, OF TALLADEGA, ALABAMA.

IMPROVEMENT IN WRENCHES.

Specification forming part of Letters Patent No. 178,780, dated June 13, 1876; application filed April 15, 1876.

*To all whom it may concern:*

Be it known that I, DAVID H. JARRARD, of Talladega, in the county of Talladega and State of Alabama, have invented a new and valuable Improvement in Wrenches; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side view of the wrench. Fig. 2 is a side view of the movable jaw and its connections detached.

This invention has relation to the construction of that class of nut-wrenches known as monkey-wrenches; and it consists in providing the sliding jaw with double loops and a jointed and toothed handle, and the fixed jaw with a reduced shank, adapted to slide in and removable from the loops, and serrated to engage with the tooth of the jointed handle, the latter being kept to its work by a spring secured to the rigid portion of the shank of the movable jaw, as hereinafter fully shown and described.

In the accompanying drawings, the letter A designates the rigid jaw of the wrench, which is provided with a hammer-head, B. The shank C of this jaw is inclosed by the loops of the shank of the movable jaw, and is reduced to slide easily in these loops, and so that it may be entirely removed therefrom at will. The inner edge of said shank C is serrated at $a$, and the end thereof may be provided with a socket, $b$, for a bit or screw-driver.

D represents the movable jaw, having a short rigid shank, E, which is provided with two loops, F F, to embrace the shank of the fixed jaw. Its end is reduced on each side to provide a tongue, $c$, rounded at its lower end, and concave shoulders $d$, the bifurcated and convex ends of the handle G being pivoted thereto. On its inside edge this handle is provided with a tooth, $e$, to engage with the serrations of the shank C, being kept to its work by a spring, $g$, bearing upon its outside edge opposite said tooth. This spring is secured to the rigid portion E of the shank of the movable jaw, and serves to keep the jointed handle in position. It may be secured by a pivot-screw so as to be turned aside when desirable.

The movable jaw and its connections, when constructed as above described, becomes an attachment to the fixed jaw, and it can be at once applied thereto, or removed, leaving the fixed jaw in shape to serve as an ordinary hammer, or, when supplied with a screw-driver or other bit, as a convenient handle.

What I claim as my invention, and desire to secure by Letters Patent, is—

1. In combination with the serrated shank C of the fixed jaw, the shank E of the sliding jaw, and the guide-loops F, the toothed handle G, pivoted to shank E, and fulcrumed in loop F, and spring $g$, arranged across the joint of the shank and handle, substantially as specified.

2. The spring $g$, secured at one end to the shank of the movable jaw, and extending across the joint therewith of the vibrating handle, substantially as specified.

In testimony that I claim the above I have hereunto subscribed my name in the presence of two witnesses.

D. H. JARRARD.

Witnesses:
 THOMAS HAYDEN,
 JAMES H. COKER.